(12) United States Patent
Wang

(10) Patent No.: US 6,482,369 B2
(45) Date of Patent: Nov. 19, 2002

(54) STRUCTURE FOR GENERATING OZONE

(75) Inventor: Long Wang, Pan Chiao (TW)

(73) Assignee: Toong Yee Co., Ltd., Taipei Hsien (TW)

( * ) Notice: Subject to any disclaimer, the term of this patent is extended or adjusted under 35 U.S.C. 154(b) by 37 days.

(21) Appl. No.: 09/814,070

(22) Filed: Mar. 22, 2001

(65) Prior Publication Data

US 2002/0136675 A1 Sep. 26, 2002

(51) Int. Cl.$^7$ ................................................ B01J 19/08
(52) U.S. Cl. ............................ 422/186.07; 422/186.04
(58) Field of Search ......................... 422/186.04, 186.07

(56) References Cited

U.S. PATENT DOCUMENTS 5,409,673 A * 4/1995 Mausgrover et al. .. 422/186.07
6,030,586 A * 2/2000 Kuan .................... 422/186.07
6,165,423 A * 12/2000 Crosbie ................. 422/186.07

* cited by examiner

Primary Examiner—Kishor Mayekar
(74) Attorney, Agent, or Firm—Bacon & Thomas, PLLC

(57) ABSTRACT

An ozone generating structure is comprised of an electric circuit board, a high voltage durable silicone rubber electric conductor and a conducting tube. The conducting tube is formed by winding a stainless steel wire which is hardly to be oxidated; and has a central passage, both ends thereof are fixed on the circuit board to connect with a first connecting line. The electric conductor has a free end extended through the central passage of the conducting tube, and has an electric conducting end welded to the circuit board to connected with a seconded connecting line. When the first and seconded connecting lines are given with a high voltage below the regulated value for the electric conductor, the surface insulation layer of the electric conductor acts as a medium between an inner wire thereof and the conducting tube and forms superficially a space having electric halation. The air in the space having the electric halation discharges under a high voltage, and ozone is generated.

7 Claims, 5 Drawing Sheets

STRUCTURE FOR GENERATING OZONE

BACKGROUND OF THE INVENTION

1. Field of the Invention

The present invention is related to a structure for generating ozone, and especially to a structure for generating ozone using a high voltage durable silicone rubber electric conductor as a medium, the structure is advantageous in having long life of use, low cost of production and good working efficiency.

2. Description of the Prior Art

As is well known, ozone is formed by high voltage thundering due to rubbing in air of a cloud in the atmosphere, it will rapidly recovered by reduction to oxygen within 5 to 15 seconds after generation thereof, the energy generated during the reduction is sufficient to rupture the molecular bonds of the bacteria in the ambient air or water; therefore, ozone has the function of sterilization and deodorization.

Since the importance of ozone to life and the process of generation thereof were discovered by human, studies for generating ozone in simulating natural thundering in the atmosphere have been being proceeded continuously. In the recent years, ozone generators are more and more lighter and handy; they can be combined with electric appliances such as refrigerators, air conditioners etc., or to assist various apparatuses to make air cleaners and silencers etc. in order that air can be purified or vegetables and fruits can be detoxified (the residual pesticides in the vegetables and fruits can be resolved in water). Thereby, ozone can deeply influence lives of families to be a part of human life.

Conventional ozone generating structures used nowadays are various, they all use the principle of providing a medium between two electrodes. The medium can be an insulation article such as a glass pipe, a ceramic piece or a quartz pipe etc. When high voltage is given, electric halation can be formed between the two electrodes, and the ambient air near the electric halation will make electric discharging to generate ozone.

The principle of ozone generating structures is simple, while quite a large amount of patents of such structures were approved; however, it is still uneasy to obtain the object of having long life of use and low rate of failure. The inventor of the present invention found after reviewing and testing several decades of patents that, conventional techniques generally have the defect of overly short life. For example, an ozone generator using a glass pipe as a medium shall make the medium very uniform with totally identical thickness all the way; otherwise, high voltage will generate high voltage concentration to make laser punching, and the whole ozone generator will no more workable. And in a structure using a ceramic piece as a medium, except the aforesaid laser punching, the structure must be worked under a very dry circumstance; once it gets humid, electricity of high voltage will make conduction, and the condition of forming electric halation will be lost.

The problems cited above are only a part among others, the problems to be solved further include: complicated structure making high cost of production, fragility of material, large volume etc., these are all the problems long resided in the ozone generating structures.

SUMMARY OF THE INVENTION

In view of this, the inventor of the present invention studied and developed an ozone generating structure after continuous improvement and experiments based on his practical experience of years in using and testing ozone generators. With the present invention, the problems cited can be solved, and the defects resided in the conventional techniques can be eliminated.

In particular, the ozone generating structure of the present invention is comprised mainly of an electric circuit board, a high voltage durable silicone rubber electric conductor and a conducting tube. Wherein, the conducting tube is formed by winding of a stainless steel wire which is hardly to be oxidated; and is provided centrally with a passage, both ends thereof are fixed on the circuit board to connect with a first connecting line. The high voltage durable silicone rubber electric conductor has a free end extended through the central passage of the conducting tube, and has an electric conducting end welded to the circuit board to connected with a seconded connecting line. When the first and seconded connecting lines are given with a high voltage below the regulated value for the high voltage durable electric conductor, the surface insulation layer of the high voltage durable electric conductor acts as a medium between an inner wire of the electric conductor and the conducting tube and forms superficially a space having electric halation. The air in the space having the electric halation discharges under a high voltage, and ozone is generated.

Although the structure for generating ozone of the present invention is simple, the entire space style is novel; the present invention has the following advantages during practicing:

1. No complicated driving electric circuit is required, it is easy for processing, and cost of production thereof is low, volume thereof has been largely reduced.
2. By using the surface insulation layer of the high voltage durable silicone rubber electric conductor acts as a medium between the inner wire of the electric conductor and the conducting tube, there is no fear of humidity, and the electric discharging halation is stable without jump spark.
3. When in giving with a high voltage below the regulated value for the high voltage durable electric conductor, a space having electric halation is formed on the surface insulation layer of the electric conductor, unless there is an external force, no high voltage concentration will be generated to make laser punching, thereby, its life can be quasi-eternal, and there will be no problem of fragility.

And more, working temperature of conventional ozone generators is proportional to the concentration of the ozone generated. For example, the working temperature of a conventional ceramic piece type ozone generator is at most about 40 J, and the concentration of the ozone generated by it is about 30 mg/hr.; while the working temperature of a glass pipe type ozone generator is at most about 80 J, and the concentration of the ozone generated by it is about 150 mg/hr. The present invention has an excellent working efficiency by the fact that the medium used is stable, and the electric discharging halation thereof is stable without jump spark; it can generate 150 mg ozone every hour under the working temperature of 40 J.

In view of the above stated advantages, the present invention can break through the limitation of technique in development of the product thereof to solve the problems existing long; it is thereby novel and advanced.

The present invention will be apparent after reading the detailed description of the preferred embodiment thereof in reference to the accompanying drawings.

DETAILED DESCRIPTION OF THE PREFERRED EMBODIMENT

Figure 1:
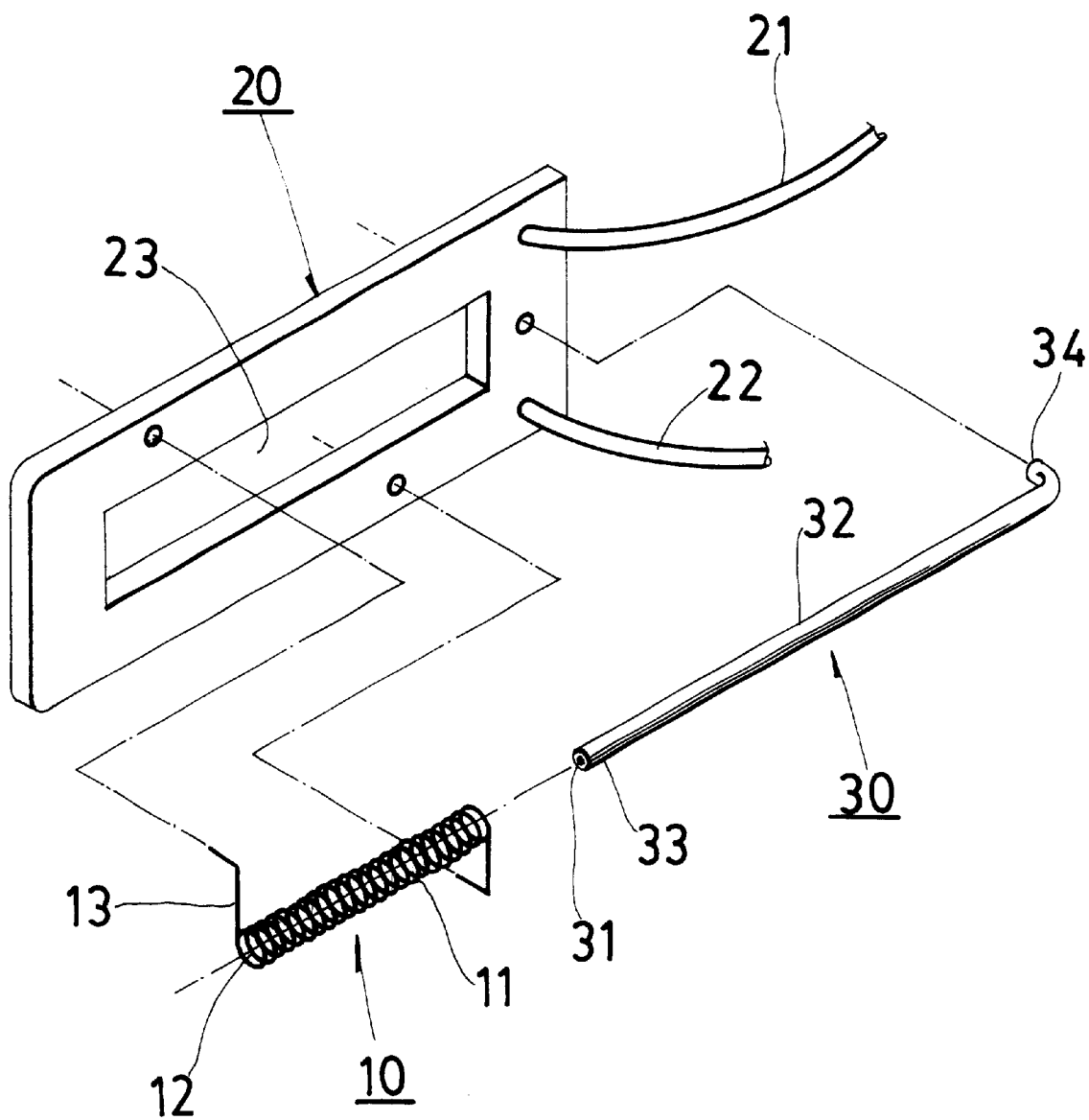
FIG. 1 is an analytic perspective view of the present invention.
Figure 2:
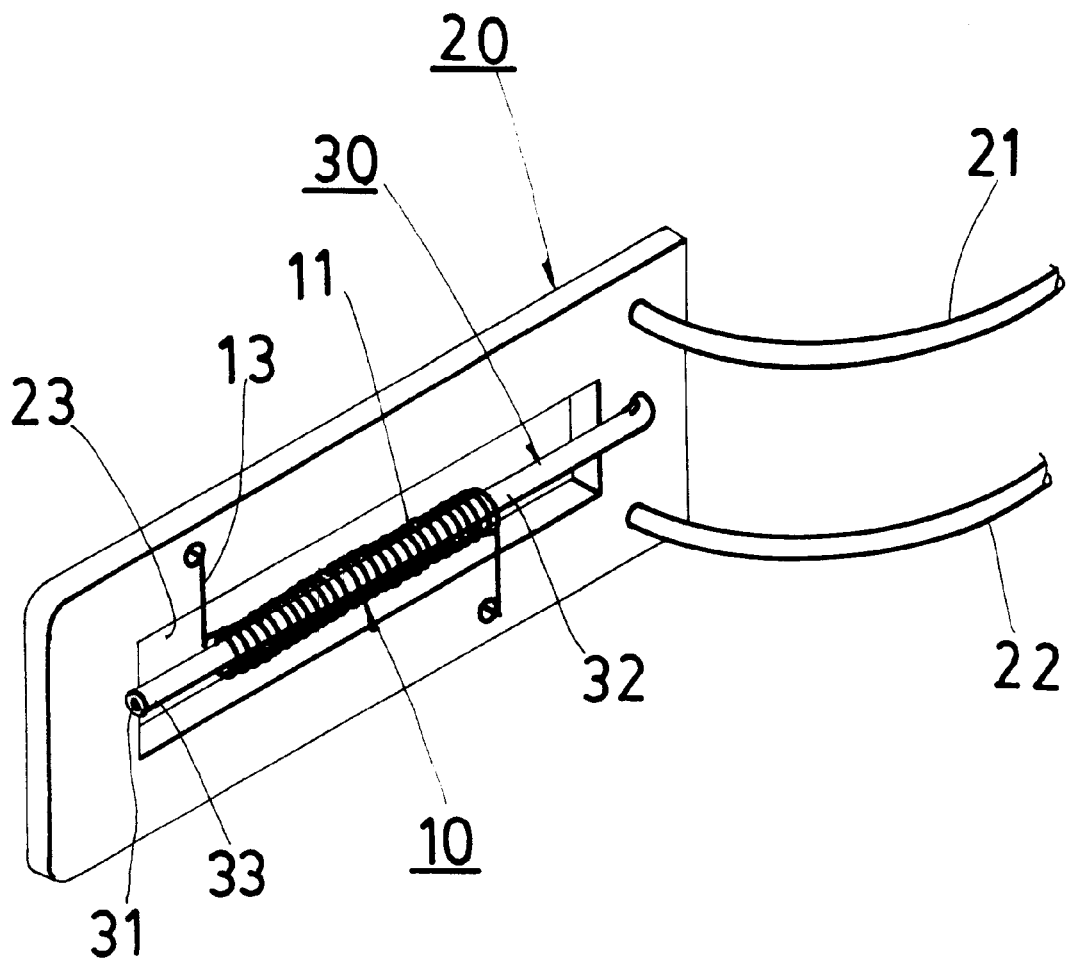
FIG. 2 is a perspective view of the present invention showing the completed assembly thereof.

Referring firstly to FIGS. 1 and 2, the structure for generating ozone of the present invention is comprised mainly of a conducting tube 10, an electric circuit board 20 and a high voltage durable silicone rubber electric conductor 30.

Wherein, the conducting tube 10 is formed as a spring by winding spirally of a stainless steel wire 11 which is hardly to be oxidated; and is provided centrally with a passage 12, both ends 13 thereof are fixed on the circuit board 20.

The circuit board 20 is provided with a first connecting line 21 and a second connecting line 22. Wherein, the first connecting line 21 is electrically connected with the two ends 13 of the conducting tube 10, while the second connecting line 22 is electrically connected with the high voltage durable silicone rubber electric conductor 30.

The high voltage durable silicone rubber electric conductor 30 has an inner wire 31 and a surface insulation layer 32; the length of the electric conductor 30 is slightly larger than that of the conducting tube 10. In the two ends of the electric conductor 30, a free end 33 is extended through the central passage 12 of the conducting tube 10 to protrude a little, and an electric conducting end 34 is welded to the circuit board 20 to connected with the seconded connecting line 22.

When the first and seconded connecting lines 21, 22 are given with a high voltage below the regulated value for the high voltage silicone rubber durable electric conductor 30, the surface insulation layer 32 of the high voltage durable electric conductor 30 acts as a medium between the inner wire 31 of the electric conductor 30 and the conducting tube 10 and forms superficially a space having electric halation on the surface insulation layer 32 of the electric conductor 30 by the action of the power source of high voltage. The air in the space having the electric halation discharges under the high voltage, and ozone is generated.

When high voltage is given to the structure of the present invention, it needs no complicated driving electric circuit, and processing of the present invention is very simple, these largely reduce the cost of production of the present invention. Moreover, the present invention uses the surface insulation layer 32 of the high voltage silicone rubber durable electric conductor 30 as the medium between the inner wire 31 of the electric conductor 30 and the conducting tube 10, there is no worry of jump spark and instability of electric discharging halation when in working under a humid circumstance, thereby, efficiency of working can be excellent, and ozone of high concentration can be generated under low working temperature. And more, in working of the present invention, it is given with a high voltage below the regulated value for the high voltage durable electric conductor 30, no high voltage concentration will be generated to make laser punching, thereby its life can be quasi-eternal, and there will be no problem of fragility. (The scope of high voltage durability is 600 v–30 kv when the diameter of the electric conductor is about 0.5–8 mm).

In addition to the above stated least elements required for practicing the present invention, the electric circuit board 20 shown in the drawings can also be made instead from any of various insulation plates (such as a ceramic plate, a rubber plate etc.), so long that the two ends 13 of the conducting tube 10 and the electric conducting end 34 of the high voltage durable silicone rubber electric conductor 30 are respectively fixed to the insulation plate and connected to the power source of high voltage.

The electric circuit board 20 stated can also be provided at the location where the conducting tube 10 is with a window 23 in favor of air circulation for generating ozone.

Figure 3:
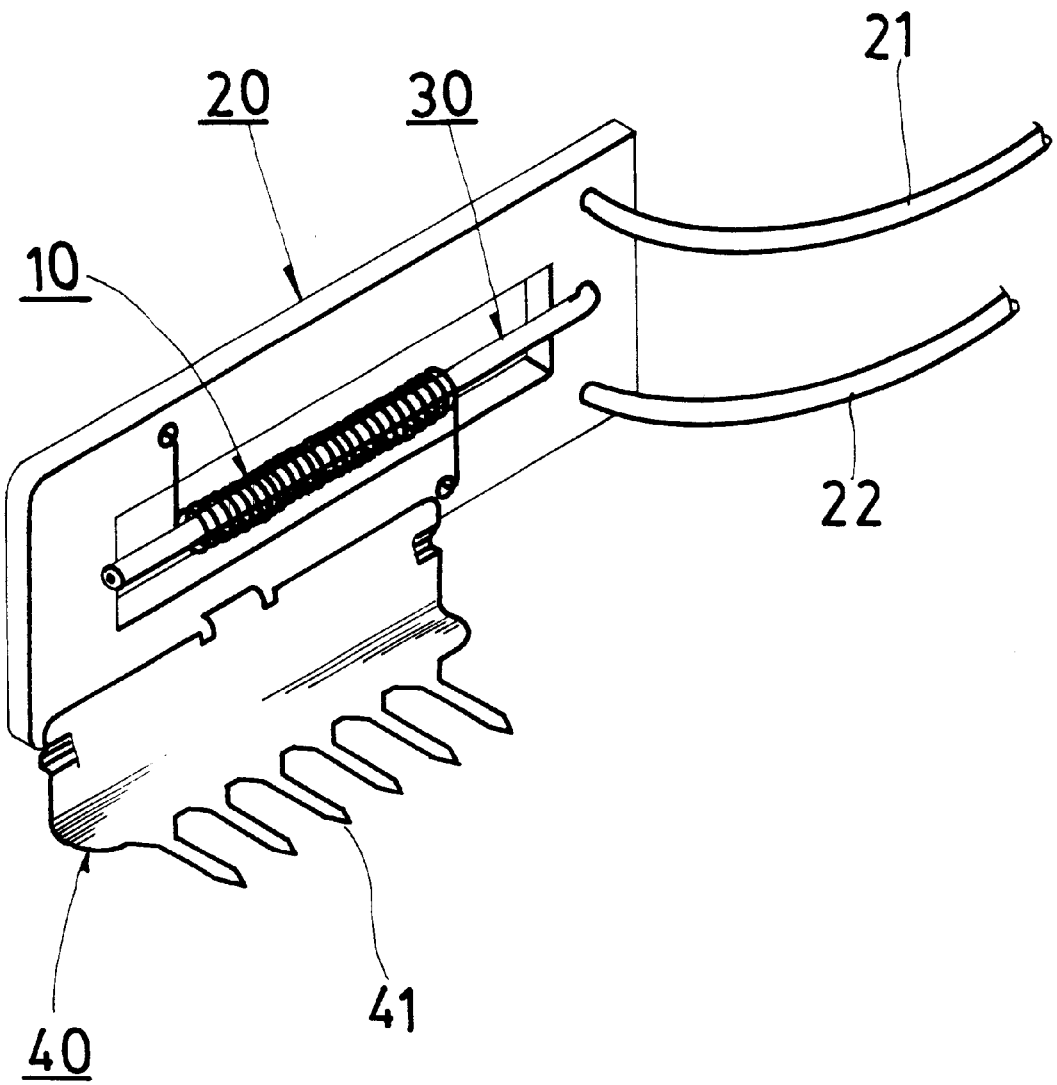
FIG. 3 is a perspective view showing an electric conducting piece is added to the present invention.

And as shown in FIG. 3, when in practicing the present invention, an electric conducting piece 40 is added thereto as are the cases of conventional ozone generators, the electric conducting piece 40 is provided with a plurality of prongs 41 mutually spaced, with which, when the ozone generating structure stated above is given with direct electric current with high voltage, the prongs 41 generate negative ions in the mode of the tips of the tree leaves or grasses wiped by natural wind, thereby dirt spreading over the air can be neutralized.

Figure 4:
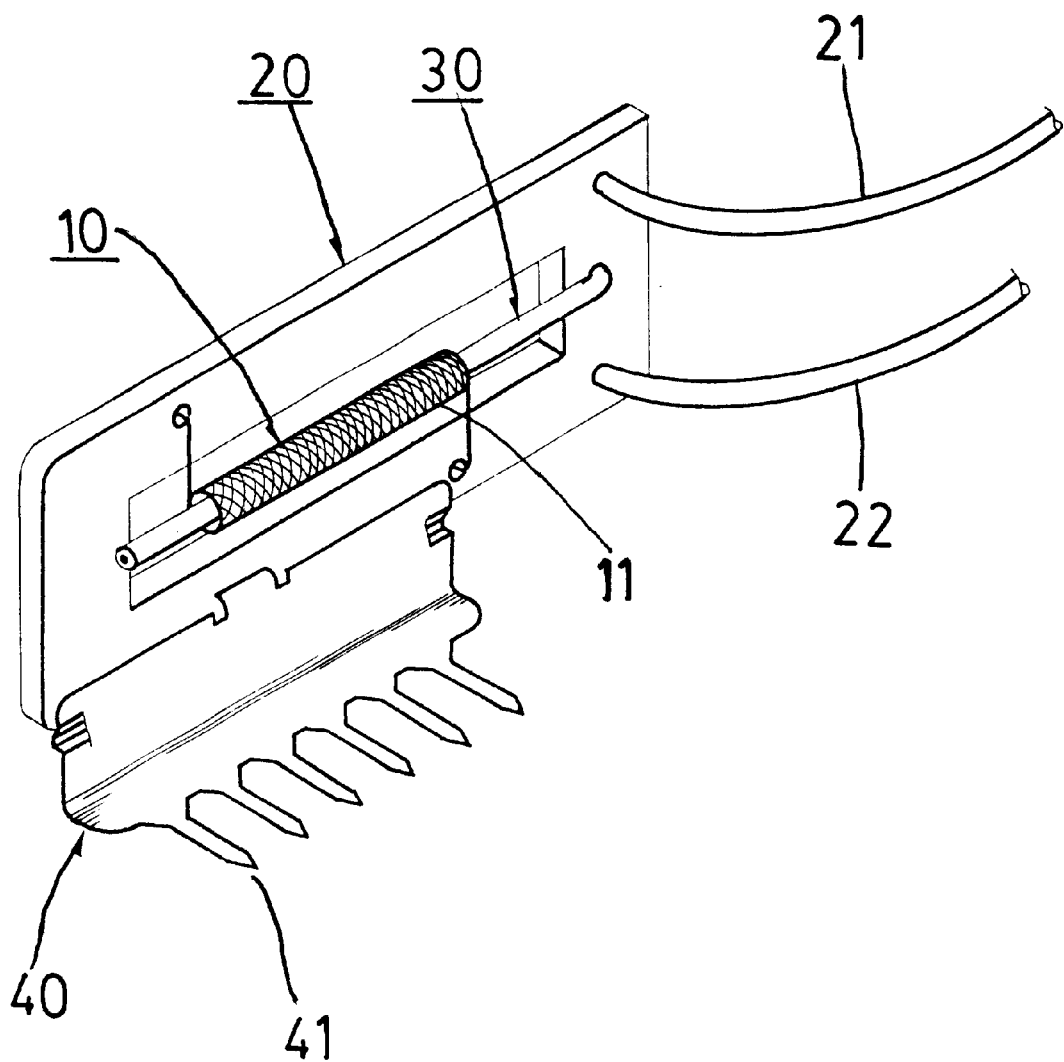
FIG. 4 is a perspective view showing a conducting tube of the present invention.
Figure 5:
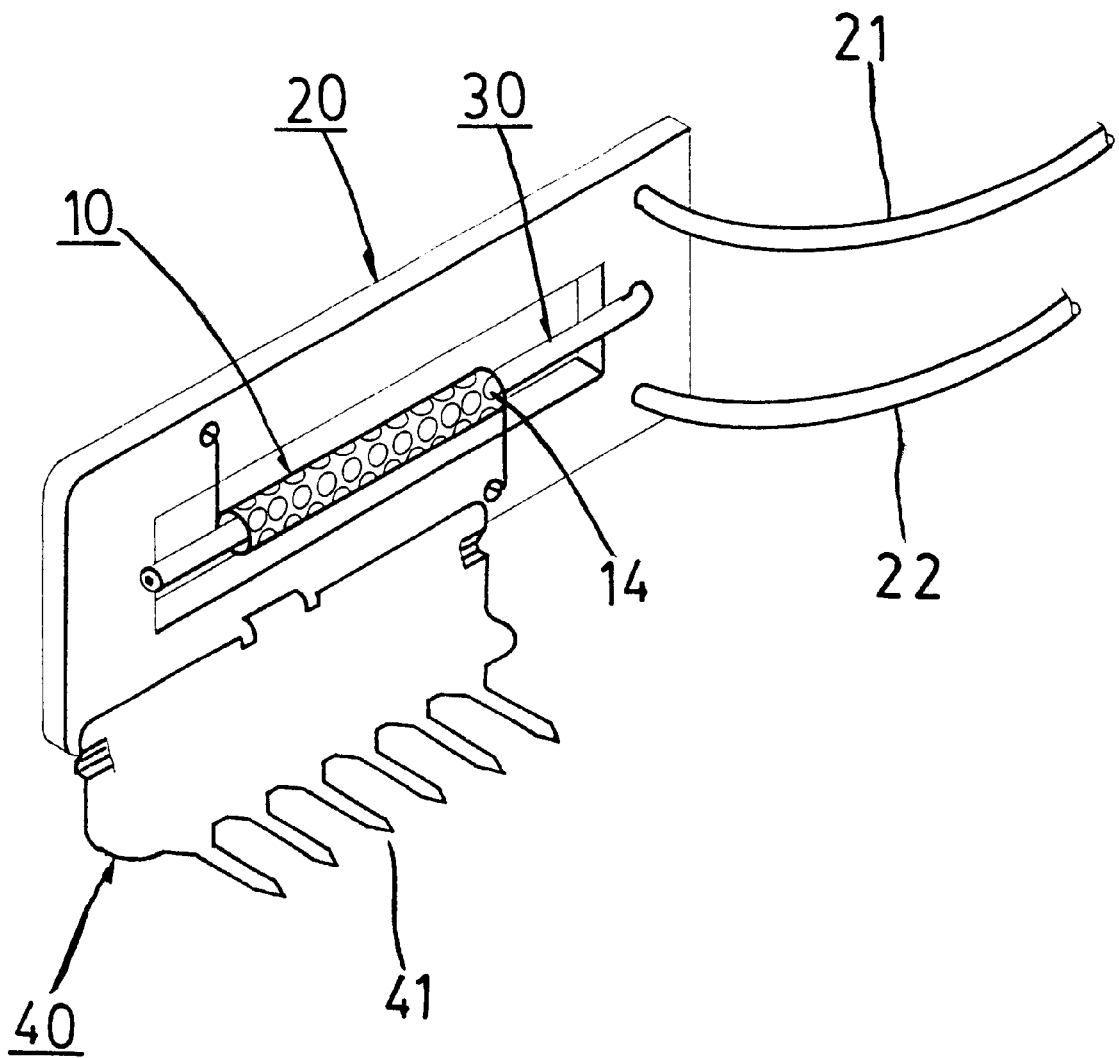
FIG. 5 is a perspective view showing another conducting tube of the present invention.

Moreover, the conducting tube 10 is formed by helically winding a stainless steel wire 11 as a spring; and as shown in FIG. 4, a plurality of stainless steel wires 11 can be alternately arranged in a mutual crossing mode to form the conducting tube 10 which thereby is formed as a net; or as shown in FIG. 5, stainless steel is used to form the conducting tube 10 which is an elongate tube with a plurality of holes 14 thereon.

The names and drawings for the elements of the above stated structure are only for illustrating a preferred embodiment of the present invention, and not for giving any limitation to the scope of the present invention. Accordingly, all substitutions and changes without departing from the spirit and principle of this invention also fall within the scope of the appended claims and are intended to form part of this invention.

What is claimed is:

1. A structure for generating ozone comprising:
   a stainless steel conducting tube provided centrally with a passage;
   an electric circuit board provided with a first connecting line electrically connected with the two ends of said conducting tube, and provided with a second connecting line; and
   a high voltage durable electric conductor electrically connecting to said second connecting line and having an inner wire and a surface insulation layer; the length of said electric conductor is slightly larger than that of said conducting tube; in two ends of said electric conductor, a free end is extended through said central passage of said conducting tube to protrude a little, and an electric conducting end is welded to said circuit board to connected with said seconded connecting line;
   when said first and seconded connecting lines are given with a high voltage below a regulated value for said high voltage durable electric conductor, said surface insulation layer of said high voltage durable electric conductor acts as a medium between said inner wire of said electric conductor and said conducting tube and forms superficially a space having electric halation on said surface insulation layer of said electric conductor by the action of a power source of high voltage, the air in said space having said electric halation discharges under a high voltage, and ozone is generated.

2. A structure for generating ozone as in claim 1, wherein, said electric circuit board is made from an insulation plate, the two ends of said conducting tube and said electric conducting end of said high voltage durable electric conductor are respectively fixed to said insulation plate and connected to said power source of high voltage.

3. A structure for generating ozone as in claim 1, wherein, said electric circuit board is provided at the location where said conducting tube is with a window in favor of air circulation.

4. A structure for generating ozone as in claim 1, wherein, an electric conducting piece is added to said electric circuit board, said electric conducting piece is provided with a plurality of prongs mutually spaced, with which, when said ozone generating structure is given with direct electric current with high voltage, said prongs generate negative ions.

5. A structure for generating ozone as in claim 1, wherein, said conducting tube is formed by helically winding a stainless steel wire as a spring.

6. A structure for generating ozone as in claim 1, wherein, said conducting tube is formed from a plurality of stainless steel wires alternately arranged in a mutual crossing mode to form a net.

7. A structure for generating ozone as in claim 1, wherein, said conducting tube is made of stainless steel to form an elongate tube with a plurality of holes thereon.

* * * * *